United States Patent [19]

Holm

[11] 4,290,205
[45] Sep. 22, 1981

[54] RIM SURFACE MEASURING GUAGE FOR WHEEL BALANCES

[75] Inventor: Donald C. Holm, San Jose, Calif.

[73] Assignee: Autotron Equipment Corporation, Mountain View, Calif.

[21] Appl. No.: 128,945

[22] Filed: Mar. 10, 1980

[51] Int. Cl.³ .......................... G01B 3/30; G01B 3/02
[52] U.S. Cl. .................................. 33/180 R; 33/203; 33/419; 33/427; 33/169 R
[58] Field of Search ............... 33/174 R, 203, 203.12, 33/203.14, 169 R, 169 C, 419, 427, 448, 450, 474, 490, 492, 464, 174 E, 168 R, 180 R; 301/5 B, 5 BA; 73/462, 466

[56] References Cited

U.S. PATENT DOCUMENTS

| 911,330 | 2/1909 | Randall et al. | 33/419 |
|---|---|---|---|
| 1,007,038 | 10/1911 | Maupin | 33/419 |
| 2,536,378 | 1/1951 | Lee | 33/189 |
| 2,690,619 | 10/1954 | Tisch | 33/168 R |
| 2,901,834 | 9/1959 | Miller | 33/168 R |
| 3,483,631 | 12/1969 | Bourgeous | 33/180 R |
| 3,623,208 | 11/1971 | Hoffmann | 301/5 BA |
| 3,636,773 | 1/1972 | Harant | 73/466 |
| 3,812,725 | 5/1974 | Frank et al. | 73/462 |
| 3,910,121 | 10/1975 | Curchod et al. | 73/462 |

Primary Examiner—Willis Little
Attorney, Agent, or Firm—Flehr, Hohbach, Test, Albritton & Herbert

[57] ABSTRACT

A gauge for use in a wheel balancing machine for ascertaining the location of the plane of the inner edge of the wheel rim. The gauge includes a flat resiliently flexible plate which has an edge that is graduated in units of distance. Extending from the plate remote from the edge is a support bar and there is means for mounting the support bar for slidable movement along its longitudinal axis to permit positioning of the graduated edge adjacent to the inner edge of the wheel rim so that the position of the rim can be ascertained by comparing its location with that of the graduations.

6 Claims, 3 Drawing Figures

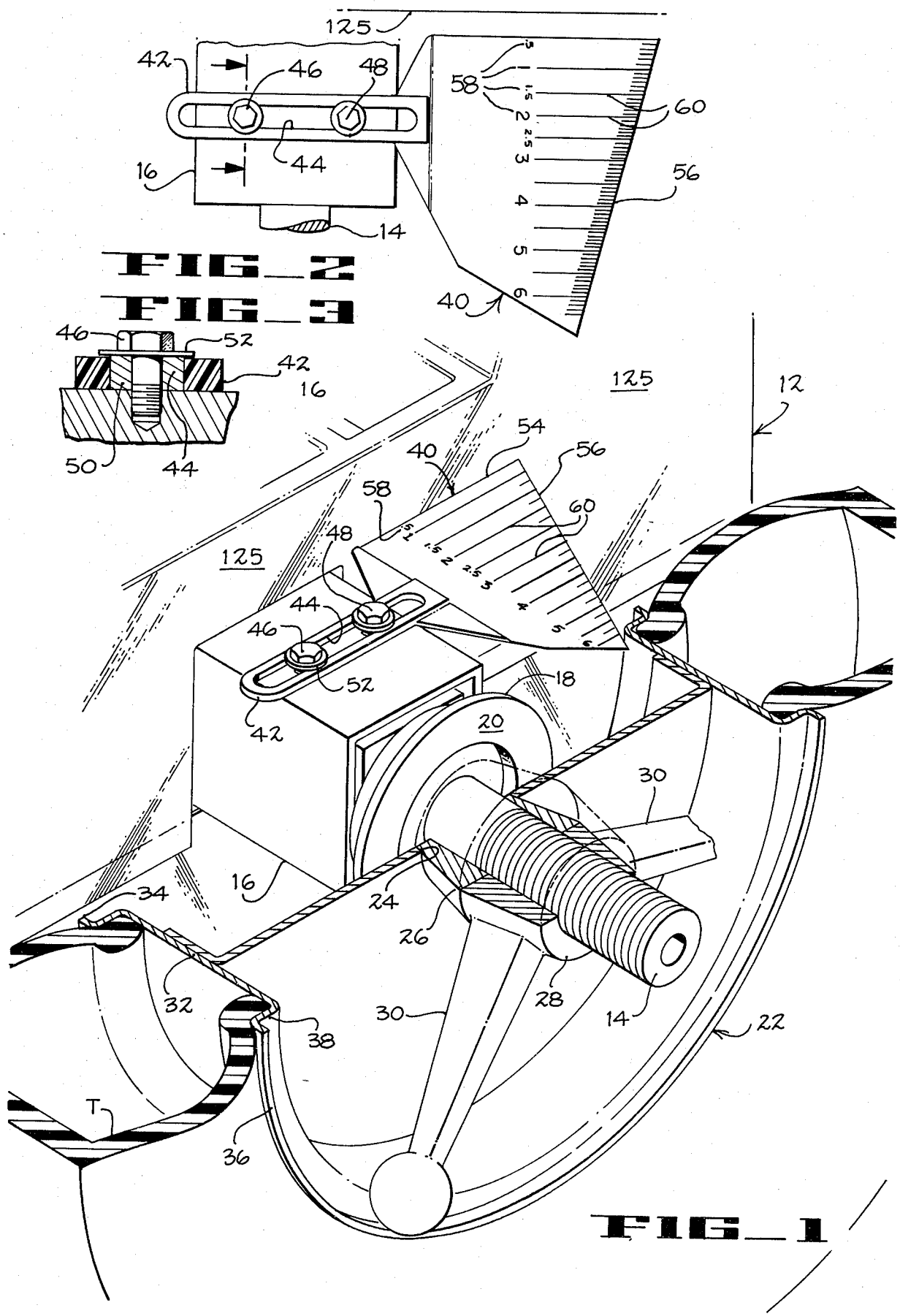

RIM SURFACE MEASURING GUAGE FOR WHEEL BALANCES

BACKGROUND OF THE INVENTION

1. Field of the Invention

This invention relates to a gauge for ascertaining the axial position of the edge of the rim of a wheel mounted on a wheel balancer.

2. Description of the Prior Art

Exemplifying the prior art environment in which the present invention can be employed is U.S. Pat. No. 3,636,733. The U.S. Pat. No. 3,636,773 patent discloses a wheel balancing apparatus wherein the distance to the planes of the inner and outer edges of a wheel rim are ascertained with respect to some reference point or points within the apparatus. Location of the planes in which the inner and outer rim edges reside is essential because it is at such location that weights are installed to balance the wheel/tire assembly. The mechanism disclosed in the U.S. Pat. No. 3,636,773 patent is adapted to move the wheel/tire assembly longitudinally of the shaft on which it is mounted until the plane of the inner rim edge is disposed in a prescribed axial position. Although the U.S. Pat. No. 3,636,733 apparatus provides acceptable results, the mechanism needed to achieve such results is unduly complicated because of the necessity that the wheel/tire assembly move longitudinally of the drive shaft on which it is mounted.

U.S. Pat. No. 3,910,121 discloses a wheel balancing machine which has an arm disposed outward of the periphery of the tire. There are two clamping assemblies adapted to slide along the arm so that the clamping assemblies can be visually positioned in alignment with the planes of the inner and outer edges of the wheel rim. Although the apparatus disclosed in the U.S. Pat. No. 3,910,121 patent produces satisfactory results, the accuracy depends in large part on the judgment of the operator because visual alignment between the clamping assembly and the wheel rim extremities is obstructed by the tire.

Another prior art mechanism for measuring the position of the plane of the inner wheel rim edge includes an elongate rigid rod supported for movement in a direction parallel to the shaft on which the wheel/tire combination is mounted. The rod has graduations thereon so that when the outer end of the rod is moved into alignment or into contact with the inner rim edge, the distance to that edge can be ascertained by noting the relative position of the graduations to a fixed index mark. This prior art arrangement also gives satisfactory results but is unduly complicated and expensive, and is dangerous in that if the rod is not retracted before power is applied to the wheel, the rod and/or the wheel can be damaged should they contact one another while the wheel is rotating.

SUMMARY OF THE INVENTION

The preferred embodiment of the invention that is described in greater detail hereinafter in connection with the appended drawings is formed of suitable synthetic plastic material molded into a one piece structure that includes a planar portion that is sufficiently thin to be resiliently flexible. The thin planar portion defines a gauge edge along which are disposed graduations and indica so that when the gauge edge is moved adjacent the wheel rim the position of the rim edge can be determined from the indicia. Integral with the planar blade portion is a relatively thicker bar portion that extends opposite from the edge of the blade. The bar portion is supported for slidable movement in a direction generally transverse of the shaft on which the rim is mounted in the wheel balancer so that the edge of the blade can be moved adjacent the edge of rims of virtually any diameter.

An object of the invention is to provide a gauge which combines accuracy with simplicity and cost of fabrication. This object is achieved by providing an extremely lightweight gauge which is mounted on the external or exterior portion of the base of the wheel balancing machine and which can be positioned in contact with the rim to permit an accurate determination of the position of the wheel rim edge with respect to the graduations on the gauge.

Another object of the invention is to provide a gauge which is safe both to the operator of the equipment and to the equipment itself. The present invention affords achievement of this object because the planar blade is formed of flexible resilient material so that even if inadvertent contact between the blade and the rotating rim occurs, the likelihood of damage either to the operator or to the equipment is slight.

A feature and advantage of the lightweight flexible gauge according to the invention is that it can be moved near to the rim while it is rotating in order to afford a visual indication of an eccentric wheel rim or a warped wheel rim.

Another feature and advantage of the present invention is that is expedites adjustment of the electronic inputs to the wheel balancing apparatus, because after a reading of the position of the plane of the inner rim edge is entered into the electronics, it is unnecessary to fold, retract or otherwise give attention to the gauge.

The foregoing together with other objects, features and advantages will be more apparent after referring to the following specification and the accompanying drawings.

BRIEF DESCRIPTION OF THE DRAWINGS

FIG. 1 is a fragmentary perspective view of a wheel balancing machine equipped with the gauge of the present invention.

FIG. 2 is a top view of a fragment of the machine of FIG. 1 showing further details of the gauge.

FIG. 3 is a cross-sectional view taken along line 3—3 of FIG. 2.

DESCRIPTION OF THE PREFERRED EMBODIMENT

Referring more particularly to the drawings, reference numeral 12 indicates a support base which is typically a massive structure and/or bolted to a floor. Supported for rotation on base 12 and rotatively driven by a power source not shown is a shaft 14. Shaft 14 is supported for rotation by bearings (not shown) which are supported in a bearing housing 16 which is rigid with base 12. On the portion of shaft 14 that extends exterior of bearing housing 16 there is a flange 18 which defines a surface 20 which is perpendicular to the axis of shaft 14.

A wheel/tire assembly 22 typically has a centrally located hole 24 through which shaft 18 extends when mounting the wheel/tire assembly on the balancing machine. Hole 24 is formed in the center of the wheel so that the wheel rim and the tire are concentric of the hole. A conventional cone mount, having an inner cone 26 and an outer cone 28, is provided for mounting the central portion of the wheel against surface 20 with hole 24 disposed concentrically of shaft 14. In the cone mounting structure exemplified in the drawings, inner cone 26 has a central clearance hole to slide over shaft 14 and outer cone 28 is threaded to mesh with complemental threads on shaft 14 to retain the wheel on the shaft. Cone 28 is provided with one or more radially extending handles 30 so as to afford rapid installation and tightening of the cone assembly and the wheel onto the wheel balancing machine. The cone mount formed by elements 26, 28 and 30 is not claimed as novel; it exemplifies any suitable means for mounting wheel/tire assembly 22 on shaft 18.

As is typical with wheels employed on motor vehicles and the like, there is a rim 32 which has an inner edge 34 and an outer edge 36. The edges are disposed at the extremities of tire beads 38 so that a tire T can be supported on rim 32 in a conventional manner Wheel imbalance is corrected by applying weights of appropriate size and appropriate locations around inner rim edge 34 and outer rim edge. 36. Because the rim edges define the locations at which the balancing weights are installed, it is important to ascertain with substantial accuracy the location of the planes in which the inner and outer edges reside. This requirement is well known in the art, as typified by U.S. Pat. No. 3,636,773 to which reference has been made previously.

For ascertaining the distance between inner rim edge 34 and a reference point on base 12, for example the surface 125 of the base, a gauge generally indicated at 40 is provided. Gauge 40 includes a relatively stiff bar portion 42 which is supported on shaft housing 16 for sliding movement in a direction generally radially of the shaft so that the portion of gauge 40 remote from bar 42 can be moved toward and away from rim 32 and rim edge 34. For so mounting bar 42, the bar is formed with an elongate slot 44. Extending through slot 44 are mounting bolts 46 ad 48 which are threaded into suitably positioned and tapped holes in shaft housing 16. As seen in FIG. 3, the bolts extend through cylindric spacers 50 which have an outer diameter or dimension approximately equal to the width of slot 44 and an axial extent slightly greater than the thicknes of bar 42. On the upper surface of spacer 50 the head of bolt 46 captures a flat washer 52 which overlies the portion of bar 42 between slot 44 and the outer edges of the bar. Accordingly, gauge 40 can be moved inward and outward of shaft housing 16.

Gauge 24 at the portion thereof remote from bar 42 includes a genrally planar blade 54. Blade 54 is preferably relatively thin and is formed of flexible resilient material such as synthetic plastic or the like. The portion of blade 54 remote from bar 42 defines an edge 56. On the upper surface of planar blade 54 adjacent edge 56 are indicia 58 associated with graduations 60. Graduations 60 can be spaced apart at suitable intervals such as 0.1 inches and indicia 58 are established to indicate distance from some reference point on or in base 12 such as base surface 125. It will be appreciated that the distance from surface 125 to force transducers within base 12 are fixed by the physical construction of the apparatus so that the position of rim edge 34 as determined by indicia 58 and graduations 60 provides an indication of the distance from the inner rim edge to the transducers.

In operation wheel/tire assembly 22 is installed on shaft 14 in a conventional manner. Before power is applied to shaft 14, gauge 40 is moved outward until edge 56 is in contact with or at least adjacent to rim edge 34. Such movement can be rapidly achieved because of the sliding support provided by bar 42, bolts 46 and 48 and their associated parts. When the user has ascertained the particular graduation and indicia with which rim edge 34 is aligned, he or she typically inputs this distance into the equipment by suitable input devices not shown. Such input devices can include a series of push buttons, a calibrated dial or the like. Additionally, if the operator wishes, he or she can rotate wheel/tire assembly 22 by hand and observe the distance between rim 32 and edge 56, thus affording an indication of concentricity of the wheel. Moreover, he or she can observe during such manual rotation whether rim edge 34 is perpendicular to shaft 14 by discerning whether the rim edge remains aligned with the same graduation 56 as the wheel is rotated.

When the foregoing steps have been completed, power is applied to shaft 14 and measurement of the amount and location of wheel misalignment is measured in accordance with well known procedures. It will be noted that should the operator inadvertently permit edge 56 of gauge 40 to remain in contact with the inner peripheral surface of rim 32, no damage will occur because blade 54 of the gauge is formed of flexible resilient material.

One specific gauge designed in accordance with the invention is fabricated in a one piece integrally molded synthetic plastic form. In such exemplary design blade 54 has a thickness of about 1/32 inch and indicia 56 and graduations 60 are molded in the surface of the blade. In such exemplary device bar 42 has a thickness of approximately ¼ inch and a width of approximately 1 inch, slot 44 being about ½ inch wide. In such exemplary structure graduations 60 are placed at increments of 0.1 inches and extend from about ½ inch to about 6 and ½ inches in a linear direction parallel to the axis of shaft 14. Edge 56 forms an angle of 15° with such linear direction, a convenience in light of the fact that larger diameter rims are typically wider to accommodate correspondingly wider tires.

Thus it will be seen that the present invention provides a gauge for ascertaining the distance of the inner rim edge of a wheel with respect to some fixed reference point in a wheel balancing machine. The gauge is extremely easy to use and is inexpensive and simple to fabricate. The gauge is virtually trouble free but, because it is retained in place by two externally accessible bolts 46 and 48, it can be readily replaced should such become necessary. Finally, the gauge virtually eliminates the possibility of damage to the equipment or to the operator because of its resilient flexible construction. Finally, because the gauge is mounted in an accessible portion of the apparatus it can be used to test the concentricity and flatness of wheel rims installed on a wheel balancer equipped with the gauge.

Although one embodiment of the invention has been shown and described, it will be obvious that other adaptations and modifications can be made without departing from the true spirit and scope of the invention.

What is claimed is:

1. A gauge for ascertaining the location of the plane of the inner edge of a vehicle wheel rim on a wheel balancer of the type having a stationary base, a driven shaft journalled for rotation on a substantially horizontal axis on said base, a portion of said shaft extending outward of said base, and means on said shaft portion for securing a wheel rim thereon to be rotatively driven thereby, said gauge comprising a generally planar blade formed of flexible resilient material, said blade having an edge and a plurality of visible indicia adjacent said edge for indicating distance in a linear direction, means for supporting said blade so that said linear direction is substantially parallel to said shaft, said blade supporting means affording movement of said blade in a direction transversely of said shaft so that said edge can be moved substantially radially toward and away from the inner peripheral surface of said rim and positioned adjacent the inner edge of said wheel rim to afford a visual indication of the position of the plane of said inner wheel rim edge.

2. A gauge according to claim 1 wherein said edge is substantially straight and is oriented at an acute angle with respect to said linear direction, the portion of said edge axially remote from said base being radially inward of the portion of said edge axially proximate said base.

3. A gauge according to claim 1 wherein said blade support means includes an elongate bar rigid with said blade at a site remote from said edge and extending in a direction substantially perpendicular to said linear direction and means slidably engaging said bar to constrain the same for affording movement thereof in a direction axially of said bar and perpendicular of said shaft.

4. A gauge according to claim 3 wherein said bar defines an elongate slot and wherein said supporting means includes first and second mounting members secured to said base at locations spaced from one another along a line perpendicular to said shaft, said mounting members being disposed within said slot and coacting with said bar to afford movement thereof.

5. A gauge according to claim 4 wherein said members each include a generally cylindric spacer having an outer dimension sized for a sliding fit in said slot, each spacer defining a central hole therethrough and a headed bolt extending through said spacer for retaining said spacer on said base, said spacer having an axial dimension slightly greater than the thickness of said bar to afford sliding movement of said bar.

6. A gauge according to claim 3 wherein said blade and said bar are integrally molded of synthetic plastic material, said bar having a thickness greater than said blade so that said bar is substantially rigid.

* * * * *